(12) United States Patent
Bondarenko et al.

(10) Patent No.: US 11,086,781 B2
(45) Date of Patent: Aug. 10, 2021

(54) METHODS AND APPARATUS FOR MONITORING PREFETCHER ACCURACY INFORMATION USING A PREFETCH FLAG INDEPENDENTLY ACCESSIBLE FROM PREFETCH TAG INFORMATION

(71) Applicant: Arm Limited, Cambridge (GB)

(72) Inventors: Natalya Bondarenko, Antibes (FR);
Florent Begon, Antibes (FR);
Nathanael Premillieu, Antibes (FR);
Pierre Marcel Laurent, Vallauris (FR)

(73) Assignee: Arm Limited, Cambridge (GB)

( * ) Notice: Subject to any disclaimer, the term of this patent is extended or adjusted under 35 U.S.C. 154(b) by 7 days.

(21) Appl. No.: 16/658,463

(22) Filed: Oct. 21, 2019

(65) Prior Publication Data
US 2020/0125492 A1    Apr. 23, 2020

(30) Foreign Application Priority Data

Oct. 22, 2018 (GB) ..................... 1817160

(51) Int. Cl.
*G06F 12/08* (2016.01)
*G06F 12/0862* (2016.01)
(Continued)

(52) U.S. Cl.
CPC ...... *G06F 12/0862* (2013.01); *G06F 12/0811* (2013.01); *G06F 12/0891* (2013.01)

(58) Field of Classification Search
None
See application file for complete search history.

(56) References Cited

U.S. PATENT DOCUMENTS

| 8,924,651 B2* | 12/2014 | Tang | G06F 12/0862 |
| | | | 711/137 |
| 2011/0113199 A1* | 5/2011 | Tang | G06F 12/0862 |
| | | | 711/130 |

(Continued)

OTHER PUBLICATIONS

Combined Search and Examination Report for GB1817160.3 dated Apr. 3, 2019, 6 pages.

*Primary Examiner* — Kevin Verbrugge
(74) *Attorney, Agent, or Firm* — Nixon & Vanderhye P.C.

(57) ABSTRACT

Examples of the present disclosure relate to an apparatus comprising processing circuitry to perform data processing operations and a hierarchical cache structure. The cache structure comprises a plurality of cache levels to store data for access by the processing circuitry, and includes a highest cache level arranged to receive data requests directly from the processing circuitry. The apparatus comprises a plurality of prefetch units, each prefetch unit being associated with a cache level and being arranged to prefetch data into the associated cache level in anticipation of the processing circuitry requiring the data, wherein: each cache level has a plurality of entries and is arranged to maintain prefetch tag information for each entry which, when a given entry contains prefetched data, indicates which prefetch unit of that cache level and/or of a lower cache level prefetched that data; and each cache level is arranged, responsive to a data request from a higher cache level, to provide to the higher cache level the requested data and the prefetch tag information corresponding to the requested data. The apparatus further comprises accuracy information storage to: maintain accuracy inferring information for each prefetch unit; and when given data is evicted from a cache level, update the accuracy inferring information based on the prefetch tag information.

18 Claims, 5 Drawing Sheets

(51) Int. Cl.
*G06F 12/0811* (2016.01)
*G06F 12/0891* (2016.01)

(56) References Cited

U.S. PATENT DOCUMENTS

2013/0138887 A1    5/2013  Chou
2016/0371187 A1*  12/2016  Roberts .............. G06F 12/0638
2019/0179757 A1*   6/2019  Walker ................ G06F 13/161

* cited by examiner

US 11,086,781 B2

METHODS AND APPARATUS FOR MONITORING PREFETCHER ACCURACY INFORMATION USING A PREFETCH FLAG INDEPENDENTLY ACCESSIBLE FROM PREFETCH TAG INFORMATION

This application claims priority to GB Patent Application No. 1817160.3 filed Oct. 22, 2018, the entire contents of which are hereby incorporated by reference.

BACKGROUND

Technical Field

The presented technique relates to the field of data processing. More particularly, it relates to prefetching of data items.

Some data processing apparatuses, such as central processing units, execute instructions defining data processing operations. The data processing operations are performed on data items. In some such apparatuses, the data items are stored in a storage, for example a memory such as a dynamic random access memory (DRAM), and temporary copies of the data items are stored in a cache for faster access during the data processing operations. For example, recently-accessed data may be stored in the cache in expectation that it is likely to be required again in the near future.

Some such apparatuses include prefetch circuitry to predict data that will be required in connection with processing operations performed by processing circuitry, and to prefetch the predicted data to the cache in advance of it being required by the processing circuitry. Processing speed is thereby improved as there is no need to wait for the predicted data to be retrieved from main memory at the time it is actually requested by the processing circuitry.

It would be desirable to be able to assess the accuracy of this prediction, in order to assess the performance of the prefetching. For example, if a given prediction scheme proves to perform poorly, it could be adjusted or replaced with a different prediction scheme.

SUMMARY

In one example configuration, there is provided an apparatus comprising:

processing circuitry to perform data processing operations;

a hierarchical cache structure comprising a plurality of cache levels, to store data for access by the processing circuitry, the hierarchical cache structure including a highest cache level arranged to receive data requests directly from the processing circuitry;

a plurality of prefetch units, each prefetch unit being associated with a cache level and being arranged to prefetch data into the associated cache level in anticipation of the processing circuitry requiring the data, wherein:

each cache level has a plurality of entries and is arranged to maintain prefetch tag information for each entry which, when a given entry contains prefetched data, indicates which prefetch unit of that cache level and/or of a lower cache level prefetched that data; and each cache level is arranged, responsive to a data request from a higher cache level, to provide to the higher cache level the requested data and the prefetch tag information corresponding to the requested data, the apparatus further comprising accuracy information storage to:

maintain accuracy inferring information for each prefetch unit; and when given data is evicted from a cache level, update the accuracy inferring information based on the prefetch tag information.

In another example configuration, there is provided a method comprising:

determining, at a highest level cache of a hierarchical cache structure associated with processing circuitry, that an entry of the highest level cache is to be evicted;

determining that the entry contains prefetched data that was prefetched into the hierarchical cache structure by a prefetch unit of a plurality of prefetch units;

determining, based on prefetch tag information associated with the entry, which prefetch unit of the plurality of prefetch units prefetched the data; and updating accuracy inferring information for the prefetch unit that prefetched the data.

In another example configuration, there is provided an apparatus comprising:

processing means to perform data processing operations;

hierarchical cache structure means comprising a plurality of cache levels, to store data for access by the processing means, the hierarchical cache structure means including a highest cache level arranged to receive data requests directly from the processing means;

a plurality of prefetch means, each prefetch means being associated with a cache level and being arranged to prefetch data into the associated cache level in anticipation of the processing means requiring the data, wherein:

each cache level has a plurality of entries and is arranged to maintain prefetch tag information for each entry which, when a given entry contains prefetched data, indicates which prefetch means of that cache level and/or of a lower cache level prefetched that data; and each cache level is arranged, responsive to a data request from a higher cache level, to provide to the higher cache level the requested data and the prefetch tag information corresponding to the requested data, the apparatus further comprising accuracy information storage means to:

maintain accuracy inferring information for each prefetch means; and when given data is evicted from a cache level, update the accuracy inferring information based on the prefetch tag information.

Further aspects, features and advantages of the present technique will be apparent from the following description of examples, which is to be read in conjunction with the accompanying drawings.

DESCRIPTION OF EXAMPLES

Figure 1:
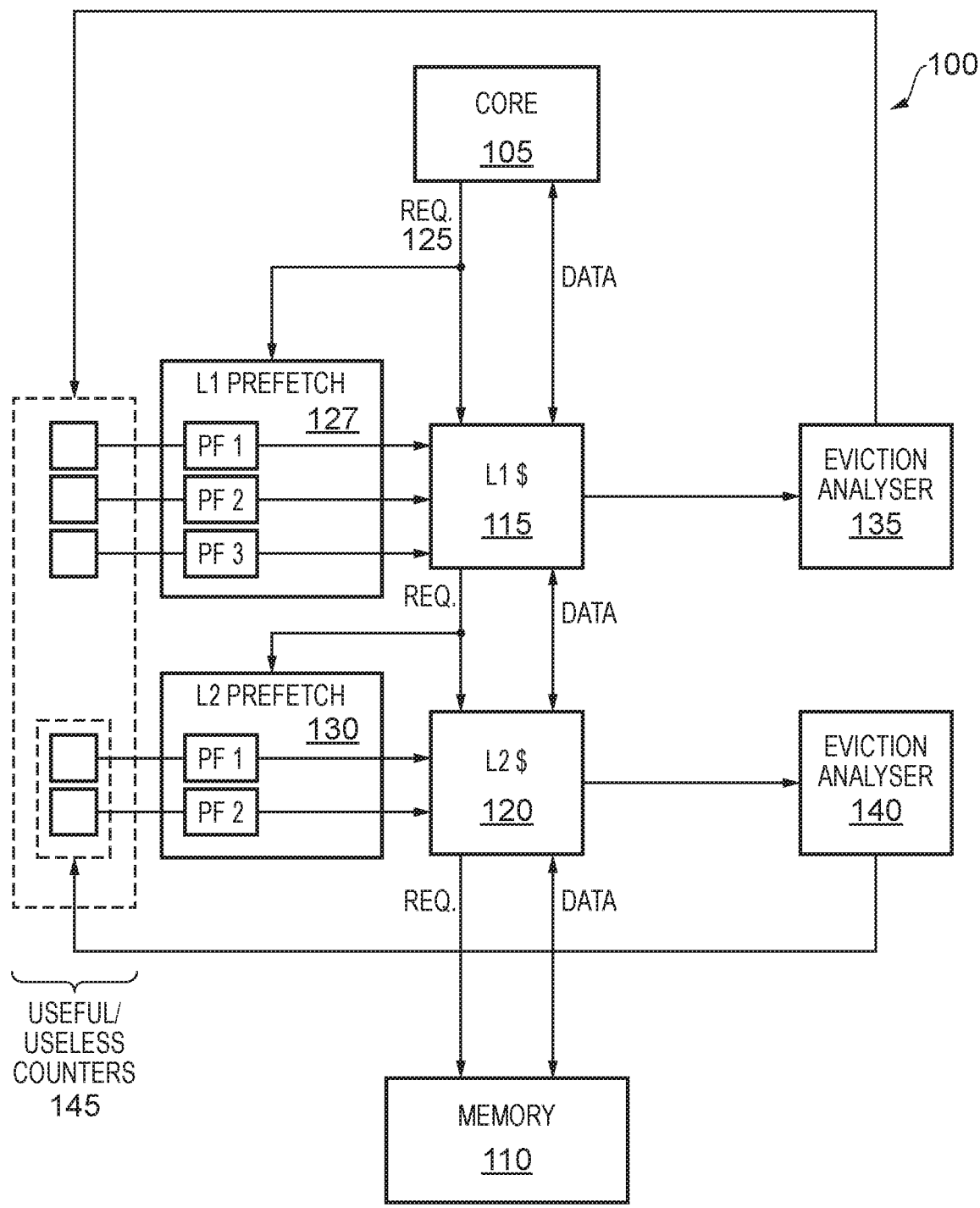
FIG. 1 shows schematically an apparatus according to an example of the present disclosure.

As described above, in some data processing apparatuses, data items are fetched to a cache, in order to have faster access to them when performing data processing operations. Some such apparatuses implement a hierarchical cache structure, as opposed to a single-level cache. In such a hierarchical structure, a highest level (which may also be referred to as level 1 or L1) cache is arranged to receive data requests directly from processing circuitry. If requested data is present in the L1 cache, it is provided to the processing circuitry. Otherwise, that data is requested from the next-lowest (level 2 or L2) cache. The L2 cache returns the data if it is present and otherwise requests the data from the next-lowest cache. This process is repeated as necessary until the lowest level cache is reached. If the data is not present in the lowest level cache, the lowest level cache requests the data from main memory. The data is then returned, through the cache levels, to the processing circuitry. Typically a lower cache level has a higher latency, such that the L1 cache has the lowest latency and the lowest level cache has the highest latency.

Whilst significant efficiency savings are provided by use of a hierarchical cache structure, the process of fetching data items into a given level cache can itself be relatively time-consuming. This can delay the performing of the data processing operations. To that end, some processing apparatuses perform prefetching of the data items into the cache structure. As noted above, such prefetching comprises predicting data items that will be requested for data processing operations. In systems implementing a hierarchical cache structure, prefetch circuitry can be provided for multiple (for example each cache level) such that prediction is independently performed for those cache levels. The prefetch circuitry at each level can comprise one or more prefetch units, each of which may apply a different prediction scheme. A plurality of the prefetch units can therefore be associated with the same cache level.

By way of example, prediction schemes can be based on patterns of previous data item retrieval. In one case, if a number of data items are successively retrieved from regularly spaced memory addresses, such as every 8th memory address, it may be predicted that this pattern will continue. For example, where the most recent data item retrievals have been from regularly spaced memory addresses x, x+8 and x+16, it may be predicted that the next retrieval would be from memory address x+24.

The predicted data items can then be fetched to the cache level in question before they are requested from a higher cache level or, in the case of the highest cache level, from the processing circuitry.

As set out above, an example apparatus comprises:
processing circuitry to perform data processing operations;
a hierarchical cache structure comprising a plurality of cache levels, to store data for access by the processing circuitry, the hierarchical cache structure including a highest cache level arranged to receive data requests directly from the processing circuitry;
a plurality of prefetch units, each prefetch unit being associated with a cache level and being arranged to prefetch data into the associated cache level in anticipation of the processing circuitry requiring the data, wherein:
   each cache level has a plurality of entries and is arranged to maintain prefetch tag information for each entry which, when a given entry contains prefetched data, indicates which prefetch unit of that cache level and/or of a lower cache level prefetched that data; and
   each cache level is arranged, responsive to a data request from a higher cache level, to provide to the higher cache level the requested data and the prefetch tag information corresponding to the requested data,
the apparatus further comprising accuracy information storage to:
   maintain accuracy inferring information for each prefetch unit; and
   when given data is evicted from a cache level, update the accuracy inferring information based on the prefetch tag information.

In this example, granular accuracy inferring information is maintained for each prefetch unit. This is achieved by tracking, via the prefetch tag information, the particular prefetch unit that prefetched given data. It can thus be determined which prefetch unit prefetched given data, even after that data has been passed up to a higher cache level than the level at which it was initially predicted. The accuracy inferring information can then be updated to reflect whether or not given predicted data was in fact required for processing operations. The accuracy assessment is thereby improved relative to comparative systems in which, for example, it is only indicated whether or not given data was prefetched and further granularity is not provided.

The accuracy information can then be applied to improve the performance of the prefetching, and thereby the performance of the data processing system as a whole, for example by reconfiguring or reprioritising the prefetch units based on their accuracy.

In an example, the highest cache level is arranged to store, for each entry thereof, a corresponding prefetch flag. For each prefetch flag, a first value indicates that the corresponding entry contains prefetched data that has not been required by the processing circuitry. A second value indicates that the corresponding entry either contains data that was prefetched and subsequently has been required by the processing circuitry, or contains data that was not prefetched but instead was fetched in response to a demand from the processing circuitry. For example, the flag may be a binary flag such that the first value is 1 and the second value is 0. The highest cache level may be arranged, when storing prefetched data, to initialise the corresponding prefetch flag to the first value and, when said stored prefetched data is required by the processing circuitry, to set the corresponding prefetch flag to the second value. When a data item is evicted from the highest level cache, it can be determined from this flag whether a given prefetched data item was predicted accurately or not. The accuracy information storage can thus be arranged to, when the given data is evicted from the highest cache level, update the accuracy inferring information based on the prefetch flag corresponding to the evicted data.

In such an example, the accuracy inferring information may comprise a non-use record for each prefetch unit. Updating the accuracy inferring information can then comprise, when the prefetch flag corresponding to the evicted data has the first value, updating the non-use record for each prefetch unit identified in the corresponding prefetch tag information. In other words, when prefetched data is evicted from the highest cache level having not actually been required by the processing circuitry, the non-use record for each prefetch unit that prefetched that data can be updated to reflect that an inaccurate prediction was made. The non-use record may for example be a non-use counter, wherein updating the non-use record comprises incrementing the non-use counter.

Alternatively or additionally, the accuracy inferring information may comprise a use record for each prefetch unit. Updating the accuracy inferring information can then comprise, when the prefetch flag corresponding to the evicted data has the second value, updating the use record for each prefetch unit identified in the corresponding prefetch tag information. Thus, analogously to the above-described non-use record, when prefetched data is evicted from the highest cache level having been required by the processing circuitry, the use record for each prefetch unit that prefetched that data can be updated to reflect that an accurate prediction was made. Similarly to the non-use counter, the use record may be a use counter wherein updating the use record comprises incrementing the use counter.

In one example in which a prefetch flag is provided, the highest cache level is arranged, for each entry thereof, to store the corresponding prefetch flag in a first storage element and to store the corresponding prefetch tag information in a second, different, storage element. For example, the prefetch flag can be stored in a single-bit flop whilst the prefetch tag information can be stored in cache random access memory (cache RAM). In some systems implementing a prefetch flag, the prefetch flag must be accessed, and potentially rewritten, each time the corresponding data is accessed. Conversely, the prefetch tag information may only be accessed when the data is evicted from the cache. Storing the prefetch flag in a separate storage element therefore improves performance relative to systems in which the prefetch flag and tags are stored in the same storage element (e.g. in cache RAM) and thus must all be accessed each time the corresponding data is read.

Alternatively or additionally, each cache level may be arranged to store address information identifying the data associated with each entry thereof in a first storage, and to store the prefetch tag information in a second storage separate from the first storage. For example, the address information, which may for example comprise address tag bits and other information such as "valid" and "dirty" bits associated with the data in question, can be stored in primary cache RAM whilst the prefetch tag information is stored in secondary cache RAM. The overall speed of accessing the cache RAM is thereby improved, in particular in examples in which the address information is required more frequently than the prefetch tag information.

In an example, the accuracy information storage is arranged, when given data is evicted from a lower cache level than the highest cache level, to update the accuracy inferring information for one or more of the prefetch units associated with that particular lower cache level, and any levels below that, based on the prefetch tag information corresponding to the given data evicted from the lower cache level. Thus, similarly to the case of the highest level cache described above, the prefetch tag information can be used to update the accuracy inferring information for the particular prefetch unit, or units, that prefetched the data in question.

In some systems, the lower cache level operates in an inclusive manner with respect to a higher cache level such that when the data in a given cache entry is promoted to the higher cache level, the data in the given cache entry is retained in the lower cache level. The updating of the accuracy inferring information for the one or more of the prefetch units associated with the lower cache level may then be conditional on a determination that said given data evicted from the lower cache level has not been provided to the higher cache level. In such a system, if evicted data has not been provided to the higher cache level, said evicted data cannot have been provided to the processing circuitry for processing operations. Prefetch units that fetched that evicted data can therefore be recorded as having performed an inaccurate prediction. The determination that said given data has not been provided to the higher cache level may comprise checking a promotion flag, associated with said given data in the lower cache level, indicating whether the given data has been promoted to the higher cache level.

In alternative systems, the lower cache level operates in an exclusive manner with respect to the higher cache level such that when the data in a given cache entry is promoted to the higher cache level, the data in the given cache entry is removed from the lower cache level. In such systems, no explicit determination of whether the given data has been promoted to the higher level is necessary: if the data is present in the lower cache level, it cannot have been provided to the higher level.

Analogously to the example described above of eviction from the highest level cache, in the present example of eviction from a lower level cache the accuracy inferring information may comprise a non-use record for each prefetch unit. Updating the accuracy inferring information may then comprise updating the non-use record for each prefetch unit identified in the prefetch tag information corresponding to the data evicted from the lower cache level. In an example in which the highest cache level stores a prefetch flag for each entry thereof, as described above, the lower cache level or levels do not store prefetch flags. Examples of the present disclosure allow granular determination of prefetch accuracy without storing prefetch flags for cache levels. This provides a significant saving of storage and power resources relative to comparative systems in which prefetch tags are stored for all cache levels, in particular in systems in which lower cache levels have progressively larger storage capacity.

As described above, the accuracy inferring information can be used to determine an accuracy for each prefetch unit. To that end, in an example the apparatus comprises accuracy determination circuitry to determine, for each prefetch unit, a prefetch accuracy based on the accuracy inferring information for that prefetch unit.

The determined prefetch accuracy of a given prefetch unit may be a determined use rate of data prefetched by the given prefetch unit. For example, as described above the accuracy inferring information may comprise a use counter and a non-use counter for each prefetch unit. The accuracy determination circuitry can then be arranged to determine the use rate for the given prefetch unit based on a ratio of the use counter to the sum of the use and non-use counters for that prefetch unit. The accuracy of each prefetch unit can thus be quantified.

Examples of the present disclosure will now be described with reference to the Figures.

FIG. 1 shows schematically an apparatus 100 according to an example of the present disclosure. The apparatus 100 can be implemented by general-purpose components, or by dedicated circuitry. For example, at least some of the components of the apparatus 100 may form part of a processing apparatus such as a central processing unit or graphics processing unit.

The apparatus 100 comprises a processing core 105 to perform data processing operations. For example, the core 105 may implement a processing pipeline via which processing instructions are fetched, decoded, and executed. The instructions may for example define operations to perform on data.

The apparatus 100 comprises main memory 110. The main memory stores the aforementioned instructions and data. The main memory may for example be implemented in dynamic random access memory.

The apparatus 100 comprises a level one (L1) cache storage 115 with a lower access latency than the main memory 110. For example, the L1 cache 115 may be implemented in static random access memory. The L1 cache 115 temporarily stores a copy of a subset of the data that is stored in the main memory 110, such that accesses to the cached data by the core 105 can be performed more quickly.

The apparatus 100 comprises a level two (L2) cache storage 120 with an access latency lower than that of the main memory 110 but higher than that of the L1 cache 115. The L2 cache 120 may have a higher capacity than the L1 cache 115. Similarly to the L1 cache 115, the L2 cache 120 temporarily stores a copy of a subset of the data that is stored in the main memory 110, such that accesses to the cached data by the core 105 can be performed more quickly.

The L1 cache 115 and L2 cache 120 together form a hierarchical cache structure as set out above. When the core 105 requires given data, it issues a request 125 for that data from the L1 cache 115. If that data is stored in the L1 cache 115, it is returned to the core 105. If that data is not stored in the L1 cache 115, the L1 cache 115 forwards the request to the L2 cache 120. If the data is stored in the L2 cache 120, it is returned to the L1 cache 115 and thence to the core 105. If the data is not stored in the L2 cache 120, the request is forwarded to the memory 110. The data is then provided from the memory, via the L2 cache 120 and L1 cache 115, to the core 105.

The apparatus 100 comprises L1 prefetch circuitry 127 associated with the L1 cache 115, which includes prefetch units PF1, PF2 and PF3. Data requests 125 issued from the core 105 to the L1 cache 115 are also provided to the L1 prefetch circuitry 127. Each prefetch unit applies a prediction scheme to the received requests, to predict data that is likely to be requested by the core 105. For example, some or all of the prediction schemes may be based on extrapolation of patterns of previous data access. The predictions (for example expressed as memory addresses, or data enabling predicted memory addresses to be determined) are provided to the L1 cache 115. If the predicted data is already stored in the L1 cache 115, no further fetching of that data is required. Otherwise, the L1 cache 115 requests the predicted data from the L2 cache 120 which can, if necessary, request the data from the memory 110 in turn.

The apparatus 100 comprises L2 prefetch circuitry 130 associated with the L2 cache 120, which includes prefetch units PF1 and PF2. Data requests forwarded from the L1 cache 115 to the L2 cache are also provided to the L2 prefetch circuitry 130. Similarly to the L1 prefetch circuitry 127, each prefetch unit of the L2 prefetch circuitry 130 applies a prediction scheme to the received requests, to predict and prefetch data that is likely to be requested from the L1 prefetch circuitry 115.

Figure 2:
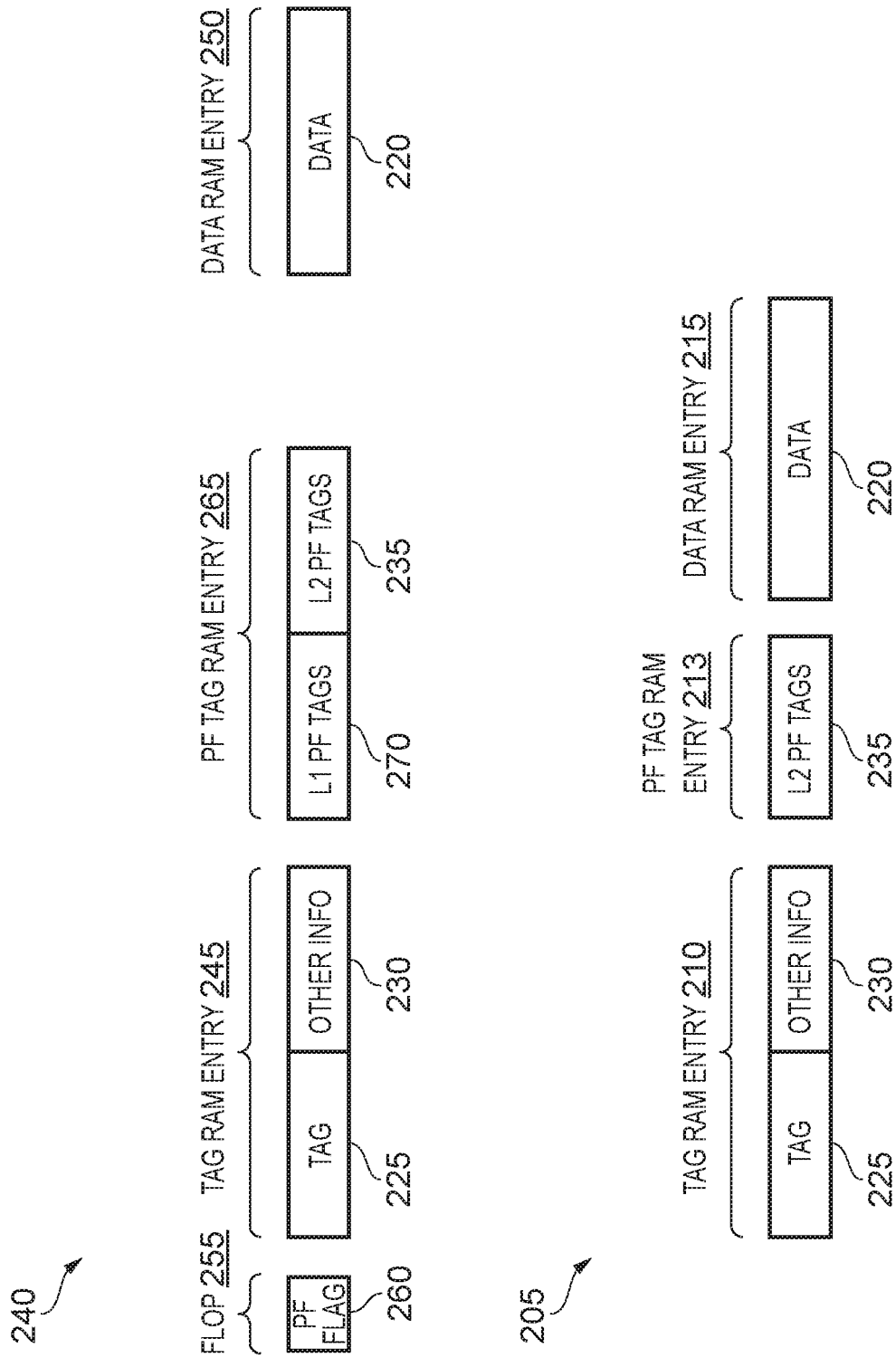
FIG. 2 schematically illustrates a way of storing prefetch flag and tag information in a cache.

Each cache level stores prefetch tag information for each data item stored therein, as will be described below in more detail in relation to FIG. 2. Each data item in the L2 cache 120 is stored with associated prefetch tag information for the L2 prefetch circuitry 130. This prefetch tag information identifies which, if any, of the L2 prefetch units prefetched that data. Each data item in the L1 cache 115 is stored with associated prefetch tag information for the L1 prefetch circuitry 127 and also for the L2 prefetch circuitry 130. This prefetch tag information hence identifies which, if any, of the L1 prefetch units and L2 prefetch units prefetched that data. The prefetch tag information may take a variety of forms provided it is sufficient to identify which prefetch unit(s) prefetched the data. In one particular example the prefetch tag information includes a sufficient number of binary bits to store a unique value for each prefetch unit at a given cache level and a unique value to indicate that no prefetch unit at that cache level prefetched the data in question. For example, when the L1 prefetch circuitry 127 has three prefetch units, the L1 prefetch tags may be stored as a two-bit value. In another example, the prefetch tag information includes a binary bit for each prefetch unit wherein a value of 1 indicates that that prefetch unit prefetched that data item and a value of 0 indicates that that prefetch unit did not prefetch that data item. Each data item in the L1 cache is also stored with an associated binary prefetch flag. As discussed above, a prefetch flag value of 1 indicates that the data was prefetched and has not yet been required for processing operations by the core 105, and a value of 0 indicates that the data either was prefetched and subsequently required by the core 105, or was not prefetched but instead was fetched in response to a demand from the core 105.

By way of example, a given data item may be prefetched from memory 110 by prefetch unit PF1 of the L2 prefetch circuitry 130. The data item is then stored in the L2 cache 120 with prefetch tag information indicating that L2 prefetch unit PF2 prefetched that data. At a later time, the data item is prefetched by prefetch unit PF1 of the L1 prefetch circuitry 127. The data item is then provided, with its associated prefetch tag information, to the L1 cache 115. The data item is then stored in the L1 cache 115 with its L2 prefetch tag information and also with L1 prefetch tag information indicating that the data was prefetched by L1 prefetch unit PF1. The complete prefetching history of the data item is thus stored.

When prefetched data is evicted from the L1 cache 115, it is analysed by an eviction analyser 135 to determine, based on the prefetch tag information and the prefetch flag, whether it was accurately or inaccurately prefetched (i.e. whether or not it was actually required by the core 105). Similarly, when prefetched data is evicted from the L2 cache 120, it is analysed by a second eviction analyser 140. Examples of this analysis logic are described in more detail below in relation to FIGS. 4 and 5. The eviction analysers 135, 140 then update "useful" and "useless" counters 145 for each prefetch unit as appropriate: the "useful" counter is incremented for each prefetch unit that accurately prefetched an evicted data item, and the "useless" counter is incremented for each prefetch unit that inaccurately prefetched an evicted data item.

In an example, the apparatus 100 comprises accuracy determination circuitry coupled with the counters 145. A separate accuracy determination unit may be associated with each prefetch unit, or with each cache level. Alternatively, the apparatus 100 may comprise a single accuracy determination unit that is associated with all the prefetch units at all cache levels. The accuracy determination circuitry processes the values of the counters 145 to determine a prefetch accuracy for each prefetch unit. The prefetch accuracy of a given prefetch unit may for example be a "use rate" of data prefetched by that prefetch unit, equal to the ratio of the "useful" counter value to the sum of the "useful" and "useless" counter values. FIG. 2 schematically illustrates one way of storing the prefetch flag and tag information in the L1 cache 115 and L2 cache 120 of the apparatus 100.

Data item 205 is stored in the L2 cache 115. The data item 205 comprises a tag RAM entry 210, a prefetch tag RAM entry 213 and a data RAM entry 215. The data RAM entry 215 includes the actual data in question 220. The tag RAM entry includes address tag information 225, which may for example comprise bits of a memory address associated with the data 220. The address tag information 225 can be used to determine whether data associated with a given memory address is stored in the cache. The tag RAM entry also includes other information 230, which may for example comprise "valid" and "dirty" bits associated with the data entry 205. The prefetch tag RAM entry 213 includes prefetch tags 235 associated with the prefetch units of the L2 prefetch circuitry 130 as described above.

When the data item 205 is provided to the L1 cache 115, it is stored in the L1 cache as data item 240. Data item 240 includes a tag RAM entry 245, comprising the address tag information 225 and other information 230 described above. Data item 240 further includes a data RAM entry 250 comprising the data 220.

Data item 240 includes a single-bit flop 255 to store the aforementioned prefetch flag 260. As explained above, storing the prefetch flag 260 in a single-bit flop 255 improves system performance in system architectures in which the prefetch flag 260 must be read every time the data item 240 is accessed, but the full prefetch tag information is only required to be read when the data item 240 is evicted from the cache.

Finally, data item 240 includes a prefetch tag RAM entry 265. The prefetch tag RAM entry 265 stores prefetch tags 270 associated with the prefetch units of the L1 prefetch circuitry 127, and also the aforementioned L2 prefetch tags 235.

The prefetch tag information 235, 270 is accessed when a data item 205, 240 is stored in a cache 115, 120 and then again when the data item 205, 240 is evicted from the cache 115, 120. Conversely, the address tag information 225 and other information 230 may be required more frequently while the data item 205, 240 is stored in the cache 115, 120. Storing the address tag information 225 and other information 230 in a separate RAM entry from the prefetch tag information 235, 270, as described above, allows the address tag information 225 and other information 230 to be accessed without also accessing the prefetch tag information 235, 270. System performance is thereby improved by avoiding needlessly accessing the prefetch tag information 235 270 each time the address tag information 225 and/or other information 230 is accessed.

Figure 3:
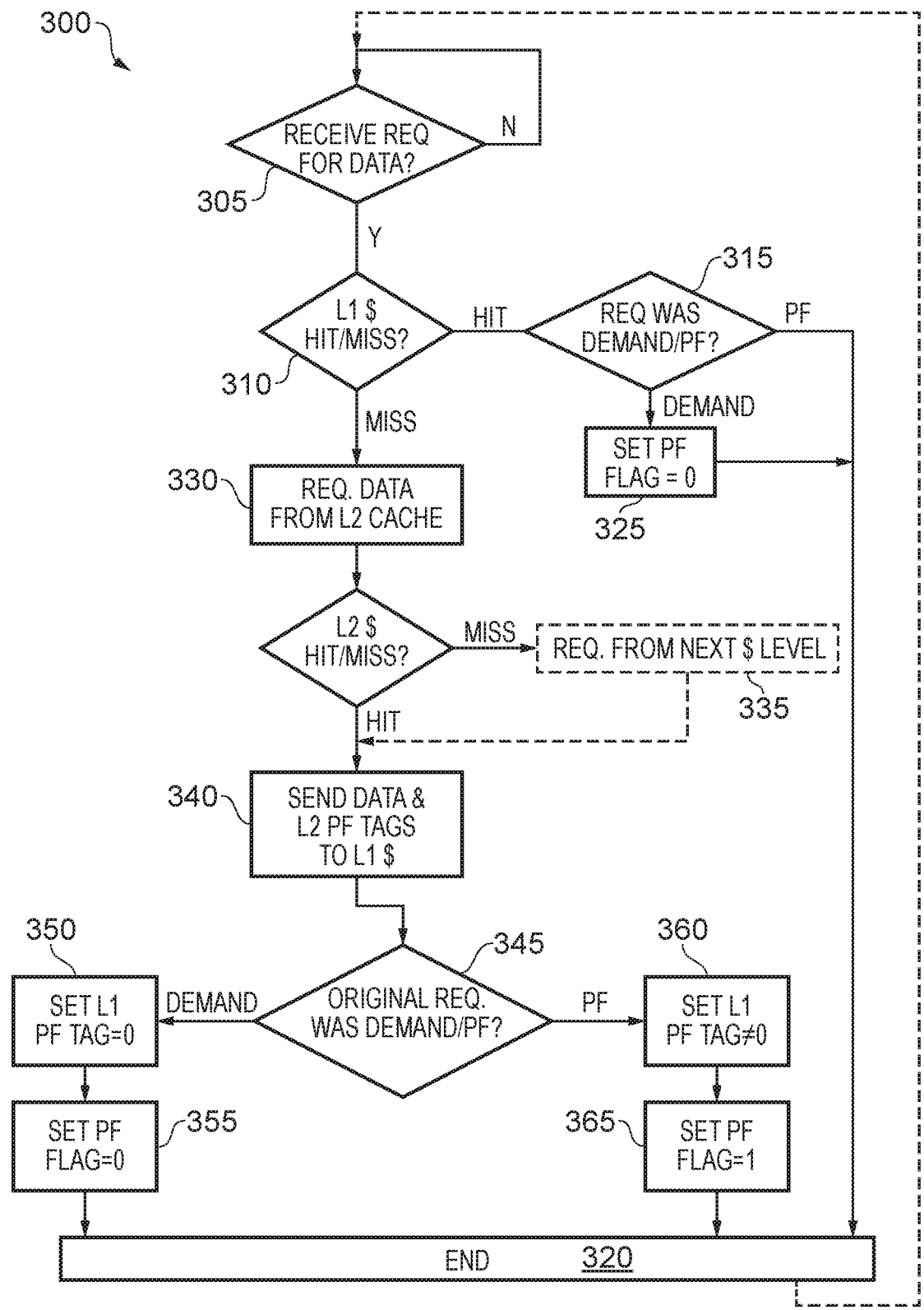
FIG. 3 shows a method for allocating data into a hierarchical cache structure.

FIG. 3 shows a method 300 for allocating data into a hierarchical cache structure such as that of apparatus 100. The method 300 is described in terms of how an L1 cache 115 handles a request for data.

At block 305 a request for data is awaited. Such a request can be received from a processing core 105 or from L1 prefetch circuitry 127.

When a request is received, it is determined at block 310 whether the request hits or misses in the L1 cache 115, i.e. whether the requested data is stored in the L1 cache 115.

If the request hits in the L1 cache 115, it is determined at block 315 whether the request was a demand from the processing core, or a prefetch request from the L1 prefetch circuitry 127. If the request was a prefetch request, flow proceeds to the end 320 and then restarts, awaiting a further request. If the request was a demand, at block 325 the prefetch flag is set equal to 0 to indicate that the requested data, even if it was originally allocated into the L1 cache in response to a prefetch request, was in fact required by the processing core 105. Flow then proceeds to the end 320 and then restarts.

If the request misses in the L1 cache 115, the data is requested from the L2 cache 120 at block 330. It is then determined at block 335 whether the request hits in the L2 cache 120. If the request misses, the data is requested from the next cache level at block 335. The process repeats analogously through the cache levels until the data is retrieved, either in a lower cache level or in the main memory. The data is then returned up through the cache levels to the L2 cache 120.

When the data is (or was) allocated into the L2 cache 120, either in response to the presently described request or a prior request, it is stored with associated L2 prefetch tag information as described in more detail above.

If the request hits in the L2 cache 120 or, in the case of an L2 cache miss, once the data has been returned through the cache levels to the L2 cache 120, the data is sent, at block 340 with its associated L2 prefetch tag information to the L1 cache 115. It is then determined at block 345 whether the original request, received at block 305, was a demand from the processing core 105 or a prefetch request from the L1 prefetch circuitry 127.

If the original request was a demand, L1 prefetch tags associated with the data are set to 0 at block 350 to indicate that no prefetch units prefetched the data. A prefetch flag associated with the data is set to 0 at block 355, to indicate that the data was not prefetched. Flow then proceeds to the end 320, and the method restarts.

If the original request was a prefetch request, L1 prefetch tags associated with the data are set at block 360 to indicate which L1 prefetch unit prefetched the data. The prefetch flag is set to 1 at block 365 to indicate that the data was prefetched. Flow then proceeds to the end 320, and the method restarts.

For the avoidance of doubt, it should be noted that the method 300 is exemplary and other implementations of the present disclosure may differ in the ordering of some steps. For example, blocks 350 and 355, or blocks 360 and 365, may be executed simultaneously or in the opposite order to that shown.

Figure 4:
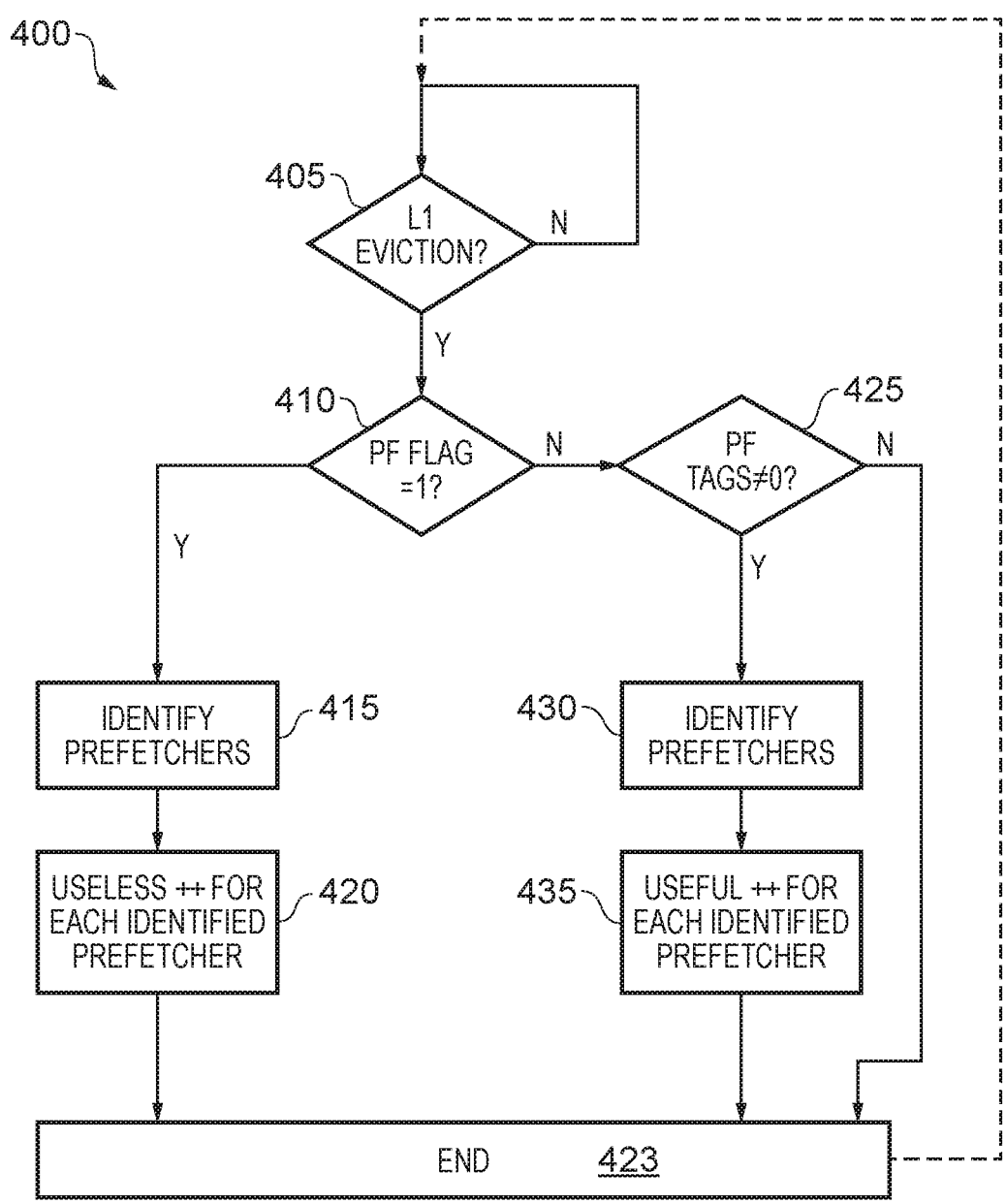
FIG. 4 shows a method for updating accuracy inferring information upon eviction of data from a level 1 (L1) cache.

FIG. 4 shows a method 400 for updating accuracy inferring information upon eviction of data from an L1 cache such as the L1 cache 115 of the apparatus 100.

At block 405 an L1 cache eviction is awaited. The eviction may for example be performed to allow a new data item to be allocated to the cache.

When an eviction occurs, the value of a prefetch flag associated with the data is determined at block 410.

If the prefetch flag is equal to 1, indicating that the evicted data was prefetched but not subsequently required for data processing operations by the processing core 105, the prefetch unit or units that prefetched that data are identified at block 415 based on the prefetch tags associated with that data. The L1 cache 115 stores prefetch tags associated with the L1 prefetch units and also the prefetch units of all lower levels, and so each prefetch unit that (incorrectly) prefetched the data can be identified. Accuracy inferring information in the form of a "useless" counter for each identified prefetch unit is then incremented at block 420. Flow then proceeds to the end 423 and restarts, awaiting a further eviction.

If the prefetch flag is equal to 0, it can be inferred that the evicted data was either allocated into the L1 cache 115 in response to a prefetch request but then subsequently required for data processing operations by the processing core 105, or allocated in response to a demand from the processing core 105 (and thus evidently required for data processing operations). It is determined at block 425 whether any prefetch tags are non-zero. If all prefetch tags are equal to zero, indicating that no prefetch units prefetched the evicted data, then the eviction is not relevant to the issue of prefetch accuracy. The method then ends at block 423 and restarts.

If at least one prefetch tag is nonzero, the prefetch tag information is analysed at block 430 to identify the particular prefetch units that (correctly) prefetched the evicted data. As for the case of incorrect prediction described above, prefetch tag information for all cache levels is stored in the L1 cache 115 and so the relevant prefetch units can be identified for all cache levels. Accuracy inferring information in the form of a "useful" counter for each identified prefetch unit is then incremented at block 435. Flow then proceeds to the end 423 and restarts, awaiting a further eviction.

Figure 5:
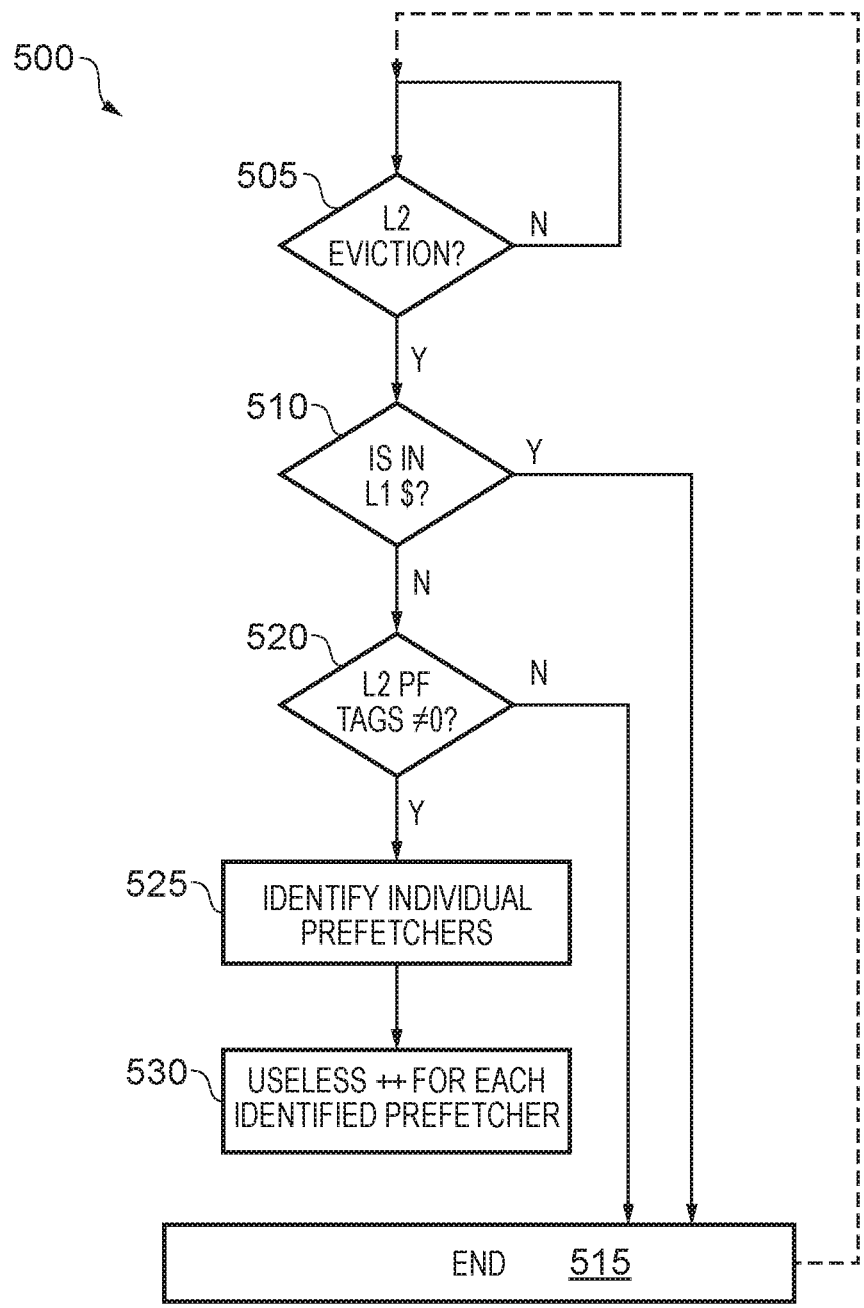
FIG. 5 shows a method for updating accuracy inferring information upon eviction of data from a level 2 (L2) cache.

FIG. 5 shows a method 500 for updating accuracy inferring information upon eviction of data from an L2 cache such as the L2 cache 120 of the apparatus 100. An analogous method 500 can be applied to lower level caches in systems with more than two cache levels.

At block 505 an L2 cache eviction is awaited. The eviction may for example be performed to allow a new data item to be allocated to the cache.

In some systems, the L2 cache 120 operates in an inclusive manner with respect to the L1 cache 115 such that when the data in a given cache entry is promoted to the L1 cache 115, the data in the given cache entry is retained in the L2 cache 120. In such systems, when an eviction occurs from the L2 cache 120, it is determined at block 510 whether the evicted data has been promoted to the L1 cache 115. If so, flow proceeds to the end 515 and then restarts, awaiting a further eviction: the accuracy determining information would be updated as appropriate as and when the data in question is evicted from the L1 cache 115. If it is determined that the evicted data has not been promoted to the L1 cache 115, flow proceeds to block 520.

In other systems, the L2 cache 120 operates in an exclusive manner with respect to the higher cache level such that when the data in a given cache entry is promoted to the higher cache level, the data in the given cache entry is removed from the lower cache level. In such systems, no explicit determination of whether the given data has been promoted to the higher level is necessary: if the data is present in the lower cache level, it cannot have been provided to the higher level. Flow thus proceeds straight to block 520.

At block 520 it is determined whether any prefetch tags have a non-zero value. If all prefetch tags are zero, it can be inferred that no prefetch units prefetched the evicted data. The method then ends at block 515 and restarts.

If at least one prefetch tag is non-zero, indicating that the data was prefetched by at least one prefetch unit (at L2 or below), the prefetch tag information is analysed at block 525 to identify the specific prefetch unit or units that prefetched the evicted data. Accuracy inferring information in the form of a "useless" counter for each identified prefetch unit is then incremented at block 530. Flow then proceeds to the end 515 and restarts, awaiting a further eviction.

No "useful" counters are incremented following an eviction from the L2 cache 120 (or a lower-level cache). In the case of an inclusive cache this is because, as noted above, the data has either been promoted to the L1 cache 115 (in which case the accuracy inferring information will be updated as appropriate when the data is evicted from the L1 cache 115) or not been promoted to the L1 cache 115. In the case of an exclusive cache, this is because data that remains in the L2 cache 120 cannot yet have been provided to the L1 cache 115.

Through use of the above described techniques, it will be appreciated that improved determinations of prefetch accuracy can be made. Prefetching performance can thus be improved, and thereby the performance of a data processing system as a whole.

Methods described herein may be performed in hardware and/or software. Such hardware may be a general-purpose processor, or a more specific unit such as an application-specific integrated circuit or a field-programmable gate array.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
  processing circuitry to perform data processing operations;
  a hierarchical cache structure comprising a plurality of cache levels, to store data for access by the processing circuitry, the hierarchical cache structure including a highest cache level arranged to receive data requests directly from the processing circuitry;
  a plurality of prefetch units, each prefetch unit being associated with a cache level and being arranged to prefetch data into the associated cache level in anticipation of the processing circuitry requiring the data, wherein:
    each cache level has a plurality of entries and is arranged to maintain prefetch tag information for each entry which, when a given entry contains prefetched data, indicates which prefetch unit of that cache level and/or of a lower cache level prefetched that data; and
    each cache level is arranged, responsive to a data request from a higher cache level, to provide to the higher cache level the requested data and the prefetch tag information corresponding to the requested data,
  the apparatus further comprising accuracy information storage to:
    maintain accuracy inferring information for each prefetch unit; and
    when given data is evicted from a cache level, update the accuracy inferring information based on the prefetch tag information,
  wherein the highest cache level is arranged to store, for each entry thereof, a corresponding prefetch flag in a first storage element, and to store the corresponding prefetch tag information in a second, different storage element, the first storage element being accessible independently of the second storage element, wherein, for each prefetch flag:
    a first value indicates that the corresponding entry contains prefetched data that has not been required by the processing circuitry; and
    a second value indicates that the corresponding entry contains data that has been required by the processing circuitry.

2. An apparatus according to claim 1, wherein the accuracy information storage is arranged to, when the given data is evicted from the highest cache level, update the accuracy inferring information based on the prefetch flag corresponding to the evicted data.

3. An apparatus according to claim 2, wherein:
the accuracy inferring information comprises a non-use record for each prefetch unit; and
updating the accuracy inferring information comprises, when the prefetch flag corresponding to the evicted data has the first value, updating the non-use record for each prefetch unit identified in the corresponding prefetch tag information.

4. An apparatus according to claim 3, wherein the non-use record is a non-use counter, and updating the non-use record comprises incrementing the non-use counter.

5. An apparatus according to claim 2, wherein:
the accuracy inferring information comprises a use record for each prefetch unit; and
updating the accuracy inferring information comprises, when the prefetch flag corresponding to the evicted data has the second value, updating the use record for each prefetch unit identified in the corresponding prefetch tag information.

6. An apparatus according to claim 5, wherein the use record is a use counter, and updating the use record comprises incrementing the use counter.

7. An apparatus according to claim 1, wherein the highest cache level is arranged:
when storing prefetched data, to initialise the corresponding prefetch flag to the first value; and
when said stored prefetched data is required by the processing circuitry, to set the corresponding prefetch flag to the second value.

8. An apparatus according to claim 1, wherein the accuracy information storage is arranged, when the given data is evicted from a lower cache level than the highest cache level, to update the accuracy inferring information for one or more of the prefetch units associated with said lower cache level, and any cache levels lower than said lower cache level, based on the prefetch tag information corresponding to the given data evicted from the lower cache level.

9. An apparatus according to claim 8, wherein:
the lower cache level operates in an inclusive manner with respect to a higher cache level such that when the data in a given cache entry is promoted to the higher cache level, the data in the given cache entry is retained in the lower cache level; and
the updating of the accuracy inferring information for the one or more of the prefetch units associated with the lower cache level is conditional on a determination that said given data evicted from the lower cache level has not been provided to the higher cache level.

10. An apparatus according to claim 9, wherein the determination that said given data has not been provided to the higher cache level comprises checking a promotion flag, associated with said given data in the lower cache level, indicating whether the given data has been promoted to the higher cache level.

11. An apparatus according to claim 8, wherein:
the accuracy inferring information comprises a non-use record for each prefetch unit; and
updating the accuracy inferring information comprises updating the non-use record for each prefetch unit identified in the prefetch tag information corresponding to the data evicted from the lower cache level.

12. An apparatus according to claim 1, comprising accuracy determination circuitry to determine, for each prefetch unit, a prefetch accuracy based on the accuracy inferring information for that prefetch unit.

13. An apparatus according to claim 12, wherein the determined prefetch accuracy of a given prefetch unit is a determined use rate of data prefetched by the given prefetch unit.

14. An apparatus according to claim 13, wherein:
the accuracy inferring information comprises a use counter and a non-use counter for each prefetch unit; and
the accuracy determination circuitry is arranged to determine the use rate for the given prefetch unit based on a ratio of the use counter to the sum of the use and non-use counters for that prefetch unit.

15. An apparatus according to claim 1, wherein each cache level is arranged:
to store address information identifying the data associated with each entry thereof in a first storage; and
to store the prefetch tag information in a second storage separate to the first storage.

16. An apparatus according to claim 1, wherein a plurality of the prefetch units are associated with the same cache level.

17. A method comprising:
determining, at a highest level cache of a hierarchical cache structure associated with processing circuitry, that an entry of the highest level cache is to be evicted;
determining that the entry contains prefetched data that was prefetched into the hierarchical cache structure by a prefetch unit of a plurality of prefetch units;
determining, based on prefetch tag information associated with the entry, which prefetch unit of the plurality of prefetch units prefetched the data; and
updating accuracy inferring information for the prefetch unit that prefetched the data,
wherein the highest cache level stores, for each entry thereof, a corresponding prefetch flag in a first storage element, and to store the corresponding prefetch tag information in a second, different storage element, the first storage element being accessible independently of the second storage element, wherein, for each prefetch flag:
a first value indicates that the corresponding entry contains prefetched data that has not been required by the processing circuitry; and
a second value indicates that the corresponding entry contains data that has been required by the processing circuitry.

18. An apparatus comprising:
processing means to perform data processing operations;
means comprising a plurality of cache levels, to store data for access by the processing means, the means to store including a highest cache level arranged to receive data requests directly from the processing means;
a plurality of prefetch means, each prefetch means being associated with a cache level and being arranged to prefetch data into the associated cache level in anticipation of the processing means requiring the data, wherein:
each cache level has a plurality of entries and is arranged to maintain prefetch tag information for each entry which, when a given entry contains prefetched data, indicates which prefetch means of that cache level and/or of a lower cache level prefetched that data; and
each cache level is arranged, responsive to a data request from a higher cache level, to provide to the higher cache level the requested data and the prefetch tag information corresponding to the requested data, the apparatus further comprising accuracy information storage means to:

maintain accuracy inferring information for each prefetch means; and when given data is evicted from a cache level, update the accuracy inferring information based on the prefetch tag information, wherein the highest cache level is arranged to store, for each entry thereof, a corresponding prefetch flag in a first storage element, and to store the corresponding prefetch tag information in a second, different storage element, the first storage element being accessible independently of the second storage element, wherein, for each prefetch flag:

a first value indicates that the corresponding entry contains prefetched data that has not been required by the processing means; and a second value indicates that the corresponding entry contains data that has been required by the processing means.

* * * * *